United States Patent [19]

Hess et al.

[11] Patent Number: 5,483,140
[45] Date of Patent: Jan. 9, 1996

[54] THYRISTOR BASED DC LINK CURRENT SOURCE POWER CONVERSION SYSTEM FOR MOTOR DRIVEN OPERATION

[75] Inventors: Herbert L. Hess, Meridian, Id.; Deepakraj M. Divan, Madison, Wis.

[73] Assignee: Wisconsin Alumni Research Foundation, Madison, Wis.

[21] Appl. No.: 130,642

[22] Filed: Oct. 1, 1993

[51] Int. Cl.⁶ .................................................. H02P 5/34
[52] U.S. Cl. ........................ 318/802; 318/722; 318/807; 363/34
[58] Field of Search ........................ 318/700–701, 318/720–724, 727, 767–773, 778–782, 794–802, 805–813; 363/10, 34–37

[56] References Cited

U.S. PATENT DOCUMENTS

| | | | |
|---|---|---|---|
| 3,707,668 | 12/1972 | Johnston | 321/5 |
| 3,710,215 | 1/1973 | Johnson | 318/801 |
| 3,854,077 | 12/1974 | Greenwell | 318/808 |
| 3,940,669 | 2/1976 | Tsubui et al. | 318/801 |
| 4,322,671 | 3/1982 | Kawada et al. | 312/801 X |
| 4,437,133 | 3/1984 | Rueckert | 361/33 |
| 4,482,853 | 11/1984 | Bharsar | 318/778 |
| 4,486,698 | 12/1984 | Blummer | 318/723 X |
| 4,567,420 | 1/1986 | Beck | 318/803 |
| 4,736,148 | 4/1988 | Hirata | 318/812 |
| 4,992,718 | 2/1991 | Kumaki | 318/268 |

OTHER PUBLICATIONS

James D. Warwick, et al., "A Variable Frequency Driver For Existing Medium Voltage Induction Motors," Proceedings of the American Power Conference, 1985.

M. Depenbrock, "Direct Self–Control (DSC) of Inverter–Fed Induction Machine," IEEE Transactions on Power Electronics, vol. 3, No. 4, Oct. 1988, pp. 420–429.

Yoshiaki Tamura, et al., "Control Method and Upper Limit of Output Frequency in Circulating–Current Type Cycloconverter," IEEE International Semiconductor Power Covnerter Conference, 1982, pp. 313–323.

H. L. Hess and D. M. Divan, "A Method to Extend the Low Frequency Operation of Load Commutated Inverters," IEEE PESC Conference Record, Jun. 1990, pp. 461–468.

N. Mohan, et al., *Power Electronics: Converters, Applications and Design*, (book), John Wiley & Sons, 1989, pp. 41–45, 354–357.

*Primary Examiner*—David S. Martin
*Attorney, Agent, or Firm*—Foley & Lardner

[57] ABSTRACT

A power conversion system for driving a three phase synchronous or induction motor receives power from AC power lines and rectifies the power to provide DC current on DC link lines through a link inductor. An inverter connected to the DC link lines is composed of three sets of two thyristors connected in series across the DC link lines. Three output lines extend from connections between each of the three sets of thyristors to the motor. Capacitors are connected across each of the three phase output lines. A controller controls the switching of the thyristors in two modes. In a first mode, used from start-up to low speed operation, a high frequency switching cycle is produced in three steps during which pairs of thyristors in different ones of the three sets are triggered. The relative length of time spent in each one of the three periods during the switching cycle is varied to obtain a desired change in the average output voltage on the three phase output lines at a fundamental frequency. The first mode provides power to drive the motor between standstill and an intermediate speed, with the phase voltages being controlled so that commutation of the thyristors is obtained during each switching cycle. While operating at any speed in the first mode, the system can transfer to a second mode having a four step switching cycle to generate a fundamental voltage component on the three phase output lines by changing the switching cycle in a six step sequence. The motor can be driven in the second mode to a desired speed, while control of the torque is obtained.

24 Claims, 11 Drawing Sheets

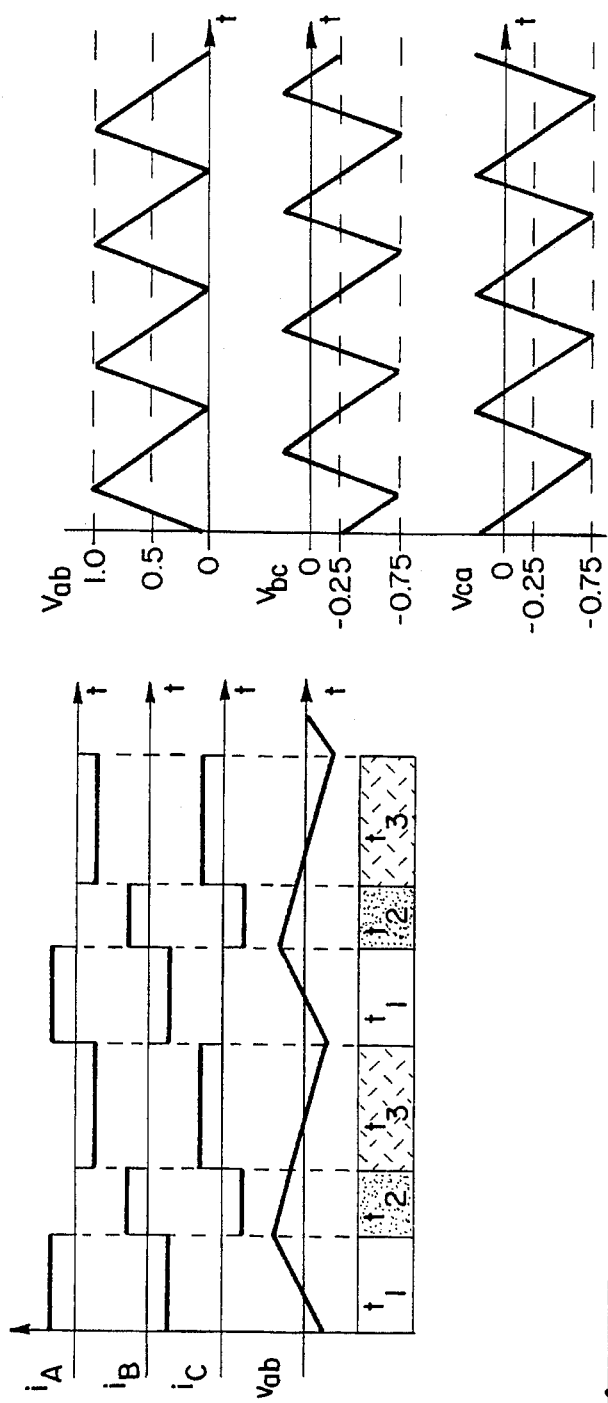
FIG. 8
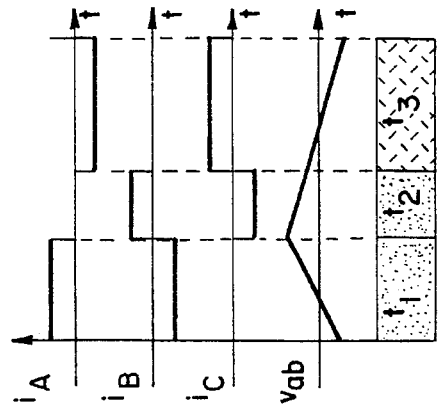
FIG. 9
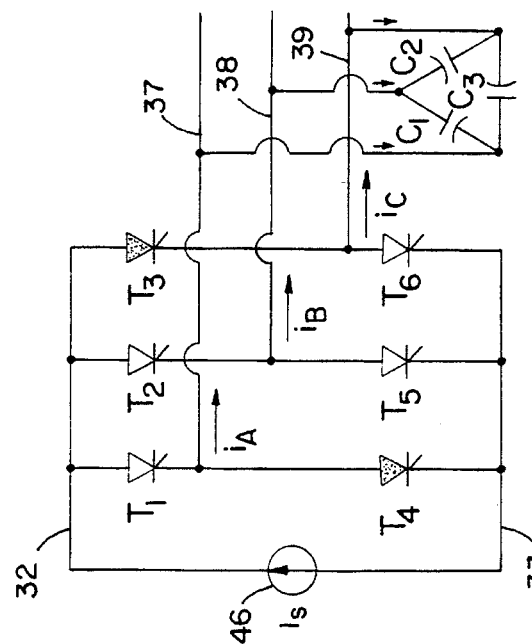
FIG. 6
FIG. 7

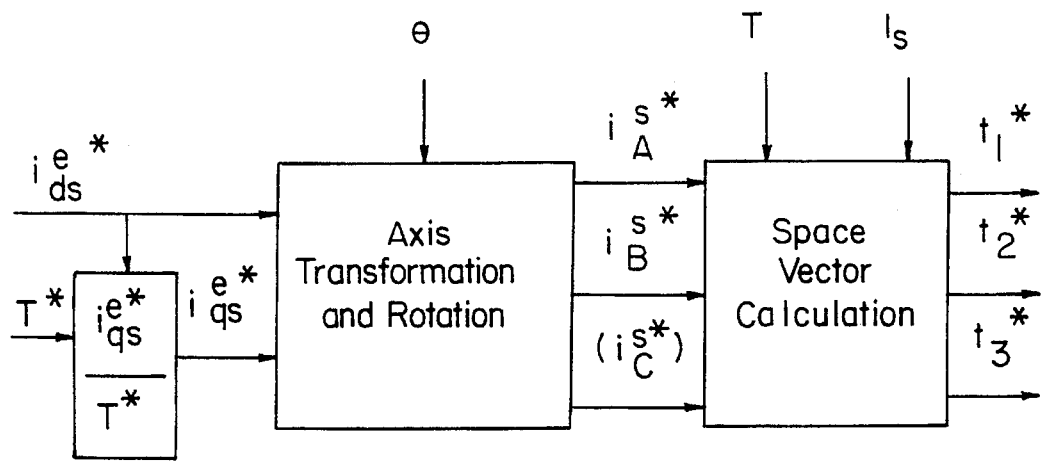
FIG. 15
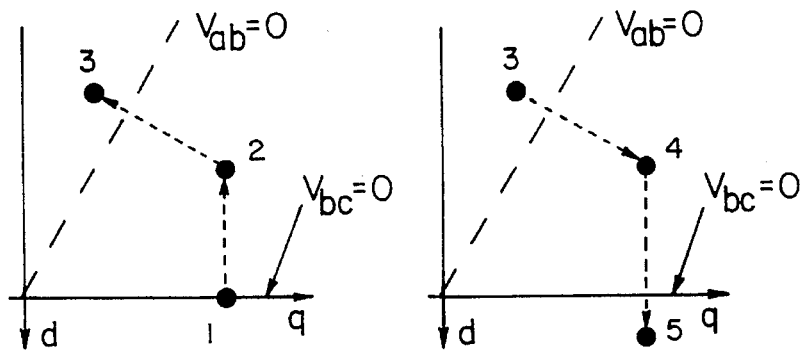
FIG. 16
FIG. 17
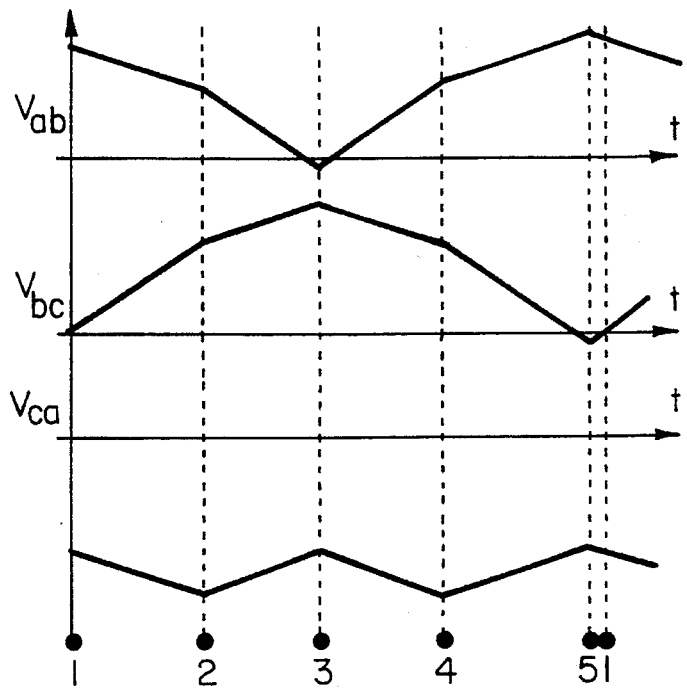
FIG. 18

THYRISTOR BASED DC LINK CURRENT SOURCE POWER CONVERSION SYSTEM FOR MOTOR DRIVEN OPERATION

FIELD OF THE INVENTION

This invention pertains generally to the field of electric motor drive systems, and particularly to thyristor based load commutated inverter drives.

BACKGROUND OF THE INVENTION

The need for high current drives in which thyristors (or SCR's) are natural and economic choices is particularly great in the driving of large electrical machines where high power requirements place significant demands on the line power. Typical of these applications are motors which drive rolling mills, such as those found in steel and aluminum plants, and the motors which drive the large fans and pumps used by utilities. To meet the requirement for drives for these types of large motors, cycloconverter circuits have been utilized. However, cycloconverters require a very large number of components (e.g., 72 thyristors), typically have undesirable input characteristics as seen by the power system, and provide undesirable harmonics in the output waveform, which requires additional front end converters.

Thyristor based load commutated inverters find important applications as variable speed drives in the 2,000 to 25,000 horsepower motor range. Natural commutation of the thyristors is dependent upon the inverter being presented with a leading power factor, typically obtained through excitation control of synchronous machine loads. However, at lower speeds, the synchronous machine reverts to a lagging power factor load, and natural commutation of the thyristors in the inverter is no longer possible. As a consequence, synchronous machine load commutated inverter drives are restricted in their frequency range and are difficult to start.

Special procedures and/or modifications to the converter circuit topology are required to allow the drive to operate below the lower frequency limits, particularly during start-up. One strategy uses a smaller rated auxiliary motor to bring the larger main motor up to a speed where load commutation of the inverter may be started. The load is subsequently connected to the larger motor after start-up. Another strategy uses firing angle control in the rectifier to interrupt the DC link current which supplies the load commutated inverter, allowing commutation to occur in the devices of the inverter. Performance using either of these strategies is characterized at low speeds by a quite limited torque capability and, particularly with the latter approach, by substantial torque ripple. As a practical matter, this restricts the loads normally driven by a load commutated inverter to those which require less torque at lower speeds and which rarely operate intentionally at low speed for very long. Examples of such loads are pumps and fans.

The load commutated inverter has also been applied to the driving of induction machines as loads, the leading power factor which is required being generated by additional capacitors connected in parallel with the load. As the frequency is reduced, the leading volt-amperes reactive (VARS) taken by the capacitors decreases until the power factor becomes lagging. Increasing the amount of capacitance is not a reasonable solution; doing so reduces the lower frequency limit, but does not eliminate it. Further, larger capacitances create leading VAR requirements which, at rated speed, can become unreasonably high. Capacitors also create resonances with the motor inductances, a problem which is difficult to control. Large terminal capacitors on an induction machine may cause an undesirable self-excitation under certain conditions, a problem which becomes progressively worse at higher speeds. Both of these approaches—excitation control and the adding of capacitance—, although widely used, have fundamental problems in at least three important performance aspects: speed range obtainable, torque obtainable at low speeds, in particular, and inverter starting procedure.

An alternate technique for extending the low frequency operating range of the load commutated inverter has been proposed in a paper by H. L. Hess and D. M. Divan, "A Method to Extend the Low Frequency Operation of Load Commutated Inverters," IEEE PESC Conference Record, June 1990, pp. 461–468. The circuit shown therein is configured as a normal load commutated inverter, but with small additional capacitors in parallel with the load. The inverter is switched at a frequency higher than the load fundamental so that the high frequency (switching frequency) current drawn by the capacitors is larger than the lagging current drawn by the load. Typically, the switching frequency is on the order of hundreds of hertz, limited by the switching losses. A net leading current is obtained for the inverter, allowing thyristor commutation, and permitting the lower frequency (load frequency) component to have a power factor which may be lagging, or even DC. As the synchronous machine speed increases to the point where it can supply its own leading VARS, the circuitry reverts to normal six step load commutated inverter operation. The control of the inverter was shown to be readily obtainable for single phase inverters. However, the strategy proposed for control of three phase inverters was complex, difficult to implement, and essentially incapable of controlling the system.

SUMMARY OF THE INVENTION

In accordance with the present invention, a power conversion system is provided for the driving of large three phase motors utilizing an efficient, minimal connection of thyristors, while obtaining adjustable drive over the full speed range of the motor from start-up to rated speed. The power conversion system may be connected to standard three phase power lines to receive power through a rectifier, particularly a controlled rectifier which may be formed of thyristors. The DC output voltage from the rectifier thyristors is provided on DC link lines and through a DC link inductor to an inverter, with the switching of the rectifier thyristors controlled to maintain a desired DC link current, typically at twice the load current. The inverter is formed of six thyristors connected in a bridge configuration with three sets of series connected thyristors connected across the DC link lines. Three output lines are connected between the thyristors in each set, with the output lines being connected to a three phase load, such as a synchronous or an induction motor. Capacitors are connected across the three phase output lines.

In a first mode, used from start-up to low speed operation of the motor, triggering signals are provided to the thyristors to cause them to switch in accordance with a basic switching cycle having three time periods. Pairs of thyristors from different sets of thyristors are triggered to conduct during each one of the three time periods within the switching cycle. The switching cycle is at a frequency much higher than the fundamental drive frequency to be applied to the load, with the fundamental frequency varying from DC to a relatively low intermediate speed, e.g., 40% of the rated speed of the motor. By adjusting the time spent in each one of the three periods within the switching cycle, the average current of the output waveform can be made to increase or decrease to follow the fundamental frequency. Commutation of the thyristors is obtained during the switching cycle as long as the voltage across each phase crosses zero during each switching cycle.

The first mode allows the motor to reach an intermediate speed, and provides relatively high torque capability during low speed drive. The first mode cannot be used to drive the motor up to its rated speed unless the peak device ratings are exceeded in so doing. If higher speed operation is desired, at the intermediate speed, the controller provides switching signals to the inverter thyristors to provide a second mode of operation using a switching cycle having four time periods. During each one of the four periods of the switching cycle, different pairs of thyristors within the different sets are triggered to conduct. The sequence for the four period switching cycle is changed in six steps over a cycle at the fundamental frequency to provide output waveforms on each of the three phases which have an average value which varies at the desired fundamental frequency. The controller then controls the fundamental frequency to drive the motor up to the desired speed and to control the torque of the motor. The second mode switching may also be used to operate the motor at low speeds and even to drive the motor up from standstill, although the first mode is preferred at lower speeds because it provides higher torque and less harmonics.

In each of the six steps of the fundamental waveform in the second mode, the switching cycle has four time periods wherein in each time period a different pair of thyristors from different sets of thyristors are triggered to conduct. In each time period current flows either in a selected first or a selected second of the output lines and through the third output line in all time periods, with current flowing in one direction alternately in the first and second output lines during the first two time periods, and with current flowing in the opposite direction alternately in the first and second output lines during the third and fourth time periods. The voltages across the first and third output lines and across the second and third output lines reach zero in each switching cycle to provide commutation of the inverter thyristors, but the voltage across the first and second output lines does not reach zero during the switching cycle. The output lines which are the selected first, second and third lines are changed during the six steps to generate the three phase outputs at the fundamental frequency.

The present invention is thus capable of operating the motor at full rated torque over a wide speed range, with field weakening available at high speeds. High torque with no low frequency torque ripple at standstill and at low speeds in either direction is obtainable. The invention uses low cost thyristors, requiring far fewer than are required in conventional large power conversion systems such as cycloconverters. The system operates within peak device voltage stress limits while guaranteeing commutation, and is suited to a flexible torque control strategy. The invention is suited to accommodate loads having a wide range of power factors, and the switching frequencies utilized are typical of conventional pulse width modulated operation.

Further objects, features and advantages of the invention will be apparent from the following detailed description when taken in conjunction with the accompanying drawings.

BRIEF DESCRIPTION OF THE DRAWINGS

In the drawings:

FIG. 6 is a simplified circuit diagram as in FIGS. 2 and 3 illustrating another firing sequence that follows the firing sequence of FIG. 4.

FIG. 7 is an illustrative diagram of the current and voltage waveforms after completion of the conduction state of FIG. 6.

FIG. 8 are illustrative voltage and current waveforms as in FIGS. 3, 5 and 7, illustrating two full cycles.

FIG. 9 are illustrative diagrams of the three phase output voltage waveforms at the switching frequency for the power conversion system of FIG. 1 with maximum voltage being the voltage $V_{ab}$.

FIG. 15 is a block diagram illustrating the calculations carried out within the controller of the power conversion system of FIG. 1 when operating in the first mode.

FIG. 16 is an illustrative diagram of the voltage locus at no load during the first two steps of the switching cycle in the second mode of operation of the power conversion system of FIG. 1.

FIG. 17 is an illustrative diagram of the voltage locus at no load of the second two steps in the switching cycle of the power conversion system of FIG. 1 when operating in the second mode.

FIG. 18 is an illustrative diagram showing the phase voltages for one typical cycle in the second mode.

DETAILED DESCRIPTION OF THE INVENTION

Figure 1:
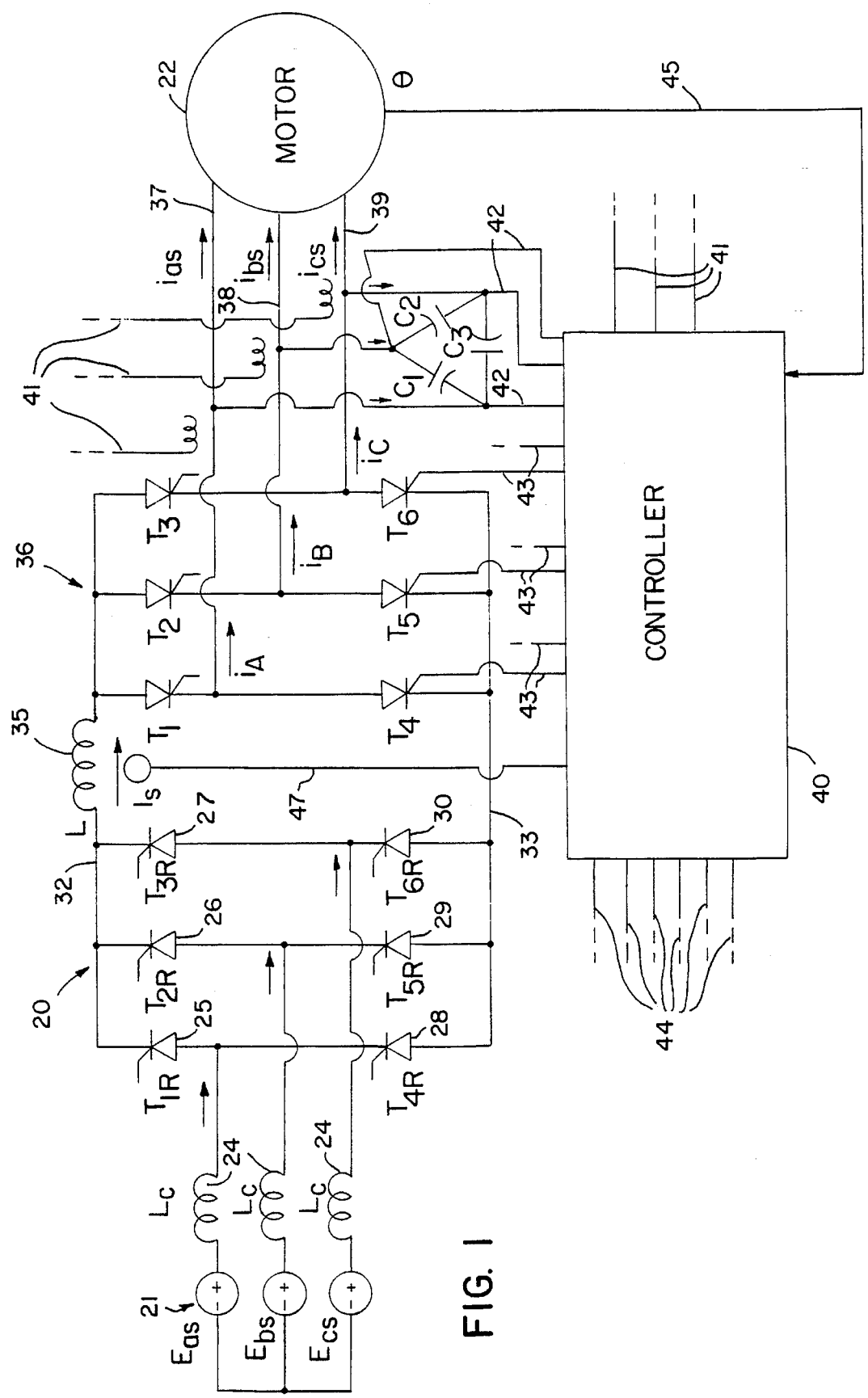
FIG. 1 is a schematic circuit diagram of a DC link current source power conversion system for driving a load, such as a motor, in accordance with the present invention.

With reference to the drawings, an exemplary power conversion system in accordance with the present invention is shown generally at 20 in FIG. 1. The power conversion system 20 is adapted to provide controllable power from a source 21 to a three phase load 22, which may be a three phase synchronous or induction motor. Inductance associated with the source, e.g., three phase commercial power lines, is represented by the inductors 24 in each of the three phase input lines. The flow of power in the system 20 is reversible, so that power may flow back from the load 22 (now acting as a source) to the power lines 21 (now acting as a load).

The power conversion system 20 includes a rectifier which, as illustrated in FIG. 1, may be formed of a full bridge of controlled rectifying devices 25-30, which may be thyristors. The rectified DC output of the bridge is provided to DC bus lines 32 and 33. A DC link inductor 35 is connected in the DC bus line 32 between the rectifier and an inverter 36 composed of a full bridge of six thyristors, designated in FIG. 1 as $T_1$ through $T_6$. The inverter bridge is composed of three sets of two series connected thyristors, i.e., the sets $T_1$ and $T_4$, $T_2$ and $T_5$, and $T_3$ and $T_6$. The two thyristors in each set are connected in series across the DC link lines. Each thyristor shown may, of course, constitute plural parallel or series connected thyristors to handle higher currents, or voltages, as is conventional. The inverter 36 has three output lines 37, 38, and 39 on which the three phase output voltages and currents are provided to the load 22. Each output line is connected between the thyristors in a respective one of the sets. Three capacitors, designated $C_1$, $C_2$ and $C_3$ in FIG. 1 are connected in a delta connection across the three phase output lines 37-39, although it is noted that the capacitors may also be connected in an equivalent Y configuration. The capacitors $C_1$, $C_2$ and $C_3$ may be relatively small in capacitance value. Generally, the capacitance of the capacitors can be chosen for a particular motor or other load so that the resonant frequency of the capacitors and load is higher than the fundamental drive frequency but lower than the inverter switching frequency. Typically, 20 μF to 50 μF capacitors may be used.

The switching of the inverter thyristors $T_1$–$T_6$, and the switching of the rectifier thyristors 25-30, is controlled out by a controller 40, which may be a computer controller, a microprocessor based controller, a microcontroller, or a digital signal processor of standard design, e.g., a Motorola 56000 Digital Signal Processor operating at 27.8 MHz. The controller 40 receives signals indicative of the three phase output currents $i_a$, $i_b$ and $i_c$ from lines 41 connected to current sensors on the output lines 37-39, and also receives signals indicative of the three phase output voltages $v_{ab}$, $v_{bc}$, and $v_{ca}$, from sensor lines 42 connected to the three phase output lines 37-39. A signal on a line 45 from a sensor on the motor provides the controller with the rotor position θ. A signal indicating DC link current $I_s$ is provided to the controller 40 on a line 47. The controller provides firing signals to the inverter thyristors $T_1$–$T_6$ on output lines 43, and can provide firing signals on output lines 44 to the rectifier thyristors 25-30 to control the desired level of the DC link current $I_s$. The controller 40 may operate the inverter 36 in two modes: a first, low speed mode for starting the motor 22 and driving it up to a desired intermediate speed, and a second, high speed mode which is used to drive the motor up to (or even beyond) its rated speed. In the present invention, the first mode is capable of driving a motor from start up to a maximum speed which is generally well below the rated speed of the motor. The second mode is capable of driving the motor from start up to rated speed. The intermediate speed at which transition from one mode to the other occurs may be anywhere within the speed range of the first mode, but it is preferable that transition occurs near the upper limit of the first mode due to the higher harmonic content of current and torque in the second mode at low speed.

The rectifier bridge and the DC link inductor 35 which provide power from the power system 21 can be equivalently represented, for analysis of the high switching frequency performance of the circuit, as an equivalent current source 46 which provides a DC current $I_s$ to the DC bus lines 32 and 33. Over short periods of time, the DC current $I_s$ provided through the inductor 35 will appear effectively as constant current from a current source. The current $I_s$ is maintained higher than any of the peak load currents in any phase. The controller 40 controls the triggering of rectifier thyristors 25-30 to maintain a value of $I_s$ greater than peak phase current and generally greater than twice the peak phase current. The implementation of the controller 40 to control the switching of the thyristors 25-30 to maintain the desired current $I_s$ is conventional. See, e.g., N. Mohan, et al., *Power Electronics: Converters, Applications, and Design* (book), John Wiley & Sons, 1989, Chap. 4, pp. 41–62. Integrated circuits which can provide delayed gate-trigger signals to the rectifier thyristors (e.g., the TCA 780) are also commercially available.

Figure 3:
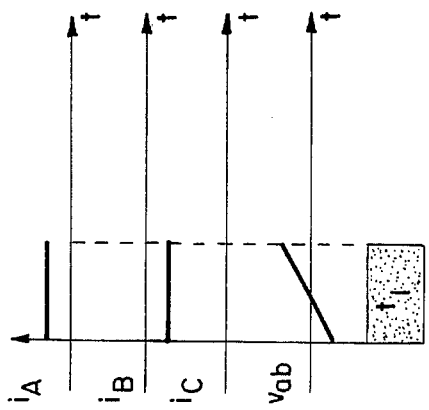
FIG. 3 is an illustrative diagram of current and voltage waveforms during the firing sequence illustrated in FIG. 2.
Figure 5:
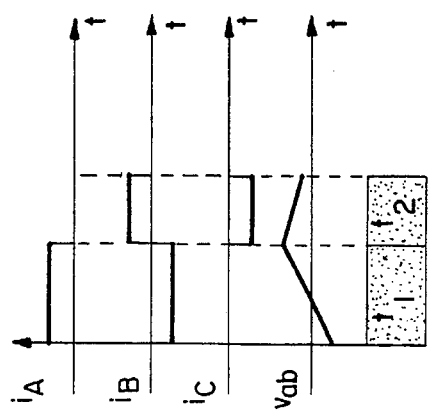
FIG. 5 is an illustrative diagram of the current and voltage waveforms upon completion of the conduction state of FIG. 4.
Figure 2:
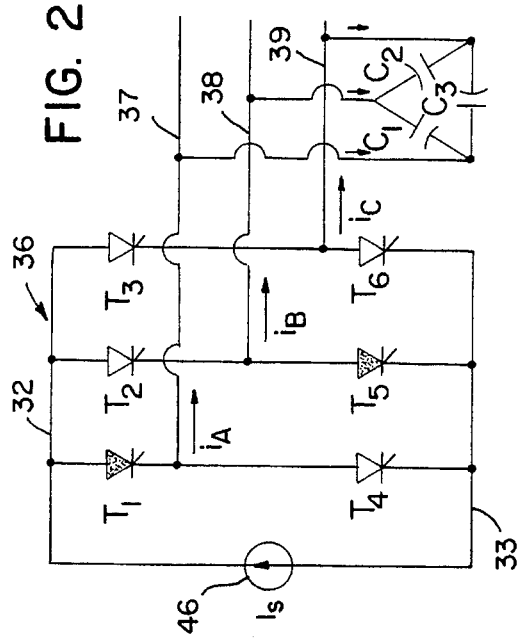
FIG. 2 is a simplified schematic circuit diagram illustrating one of the firing sequences in the first mode of the power conversion system of FIG. 1.
Figure 4:
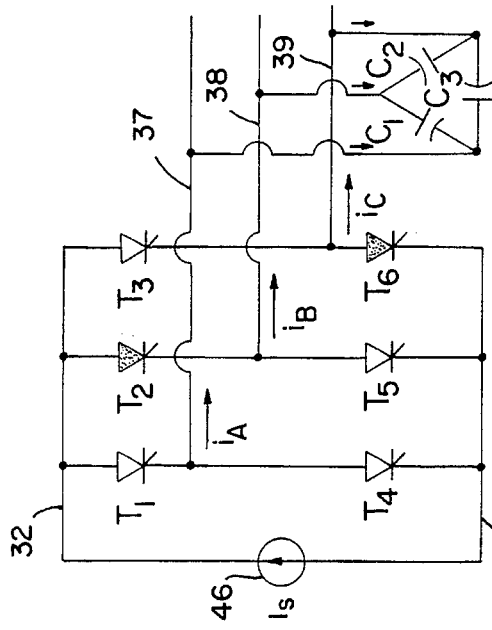
FIG. 4 is a simplified schematic circuit diagram as in FIG. 2 illustrating a different firing sequence.

The switching strategy in the first mode during start-up of a motor as the load 22, and low speed operation of the motor, is illustrated with respect to the circuit diagrams of FIGS. 2, 4, and 6, and the corresponding waveforms of FIGS. 3, 5, and 7. As illustrated in FIG. 2, in a first step, during a time $t_1$, the thyristors $T_1$ and $T_5$ are turned on, providing current on the lines 37 and 38 through one of the capacitors $C_1$ (with the capacitors being shown in a delta configuration for simplicity). Because $I_s$ is greater than any load phase currents, current in the capacitor $C_1$ is positive. The result is a linear build-up of the voltage $v_{ab}$ across the lines 37 and 38 and the capacitor $C_1$ as illustrated in FIG. 3. During this step, the current on the line 39 is essentially zero, and the currents on the lines 37 and 38 are constant and in opposite directions. Eventually, thyristors $T_2$ and $T_6$ will become forward biased.

In the next step, as illustrated in FIG. 4, during the time $t_2$, the thyristors $T_2$ and $T_6$ are turned on, after the turn-on signals to the gates of the thyristors $T_1$ and $T_5$ are removed, with the result that the thyristors $T_1$ and $T_5$ are back biased and commutated off by the voltage across the capacitor $C_1$ transmitted through the thyristors $T_2$ and $T_6$. Current now flows through the capacitor $C_2$, charging it up, and ramping down the voltage $v_{ab}$ across the lines 37 and 38. The thyristors $T_3$ and $T_4$ soon become forward biased under this condition. The time period $t_2$ may be shorter, longer, or equal to the time period $t_1$, depending on the requirements as determined by the controller 40.

The third step in the synthesis of the voltage waveform is carried out, as shown in FIG. 6, by turning on the thyristors $T_3$ and $T_4$ at a time when they are forward biased. The voltage $v_{ab}$ will ramp down if the DC link current is at least twice the load current. The voltage across the capacitor $C_2$ commutates the thyristors $T_2$ and $T_6$, and current flows through the thyristor $T_3$ to the line 37, through the capacitor $C_3$, and thence through the thyristor $T_4$. As shown in FIG. 7, the voltage $v_{ab}$ across the lines 37 and 38 continues to ramp down during the third step, carried out over a time period $t_3$ which is typically longer than the time period $t_1$. Eventually, the thyristors $T_1$ and $T_5$ become forward biased, and the cycle may be repeated.

The three step firing sequence described above is not the only available sequence which gives a similar performance. An alternative sequence is: turn on $T_2$ and $T_4$, then $T_3$ and $T_5$, and then $T_1$ and $T_6$, with voltage and current waveforms of inverse polarity to those shown in FIGS. 3, 5 and 7 being generated. Reversing either sequence provides a negative sequence voltage and current waveform at the switching frequency. Given the significant difference between the preferred thyristor switching frequency, which may be several hundred hertz, and the load fundamental frequency typically less than 30 Hz, any of the sequences may be used.

The exemplary full waveform over two cycles at the switching frequency is illustrated in FIG. 8 and the three phase voltage waveforms are illustrated in FIG. 9 where the peak voltage appears between lines 37 and 38 ($V_{ab}$).

Figure 10:
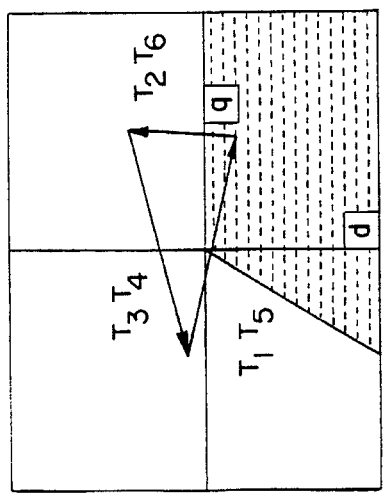
FIG. 10 is a space vector representation of the voltage locus during the first mode of operation of the system of FIG. 1.

The locus subtended by the switching format described above, set forth in Table 1 below, is illustrated using space vectors in FIG. 10. In Table 1, the numbers indicate which thyristors are turned on; e.g., the table entry "51" means that thyristors $T_1$ and $T_5$ are on.

TABLE 1

| SEQUENCE GROUP | TIME PERIOD IN SEQUENCE | | |
|---|---|---|---|
| | $t_1$ | $t_2$ | $t_3$ |
| a | 51 | 62 | 43 |
| b | 35 | 16 | 24 |
| c | 62 | 51 | 43 |
| d | 16 | 35 | 24 |

In the three step switching sequence set forth in Table 1, the switching sequence cycles continuously as: $t_1 \rightarrow t_2 \rightarrow t_3 \rightarrow t_1 \rightarrow \ldots$. Any of the four sequences of Table 1 (a,b,c, or d) may be used. As seen from Table 1 and FIGS. 3, 5, and 7, in each time period a different pair of thyristors from different sets of thyristors is triggered to conduct.

Figure 11:
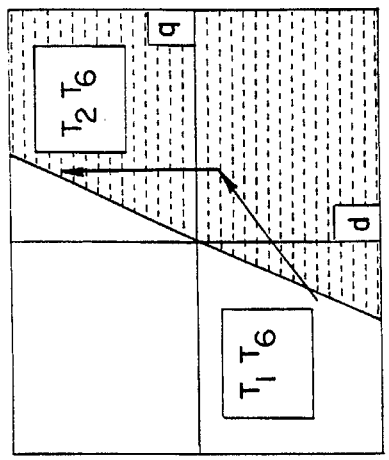
FIG. 11 is a space vector representation of voltage commutation during the first mode of operation of the system of FIG. 1.
Figure 12:
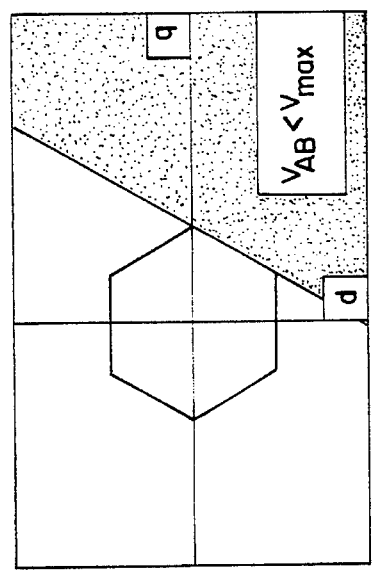
FIG. 12 is a diagram illustrating the peak voltage stress limits during the first mode of operation of the system of FIG. 1.

Commutation requirements can also be illustrated in space vector format, as shown in FIG. 11. Commutation from device $T_1$ to $T_2$ may be accomplished only in the shaded half plane of FIG. 11. Simultaneous commutation from $T_1$ to $T_2$ and from $T_5$ to $T_6$ may be accomplished only in the shaded region in FIG. 10, which is the intersection of the commutation regions for the respective individual commutations. If the DC link current is greater than the amplitude of each load current, a vector to move the voltage locus toward commutation is available. Commutation overlap, limited only by stray inductance in series with the switching devices, is quite brief and may be considered negligible in duration. Because the thyristors support line-to-line voltages, limits on peak device voltage stresses translate directly into line-to-line voltage limits. For one of the phases, this limit is illustrated by the shaded region in FIG. 12. If all thyristors have the same peak voltage limits, then the voltage locus must remain in a hexagonally shaped region illustrated by the line 48 in FIG. 12.

Assuming a constant $I_s$ and DC modulation conditions, the line current waveforms at the inverter terminals are generally of the shape as shown in FIG. 8. Inspection reveals that time intervals $t_1$, $t_2$, and $t_3$ are not necessarily of equivalent length and the currents may each have a non-zero average value. If the load fundamental frequency is not DC, but is instead a frequency much lower than the carrier frequency, then the assumption of DC modulation conditions may still be a valid approximation over a single carrier period. In this case, the load fundamental current magnitude during one period of the switching cycle may be approximated as the average value of the current over that same period.

Figure 14:
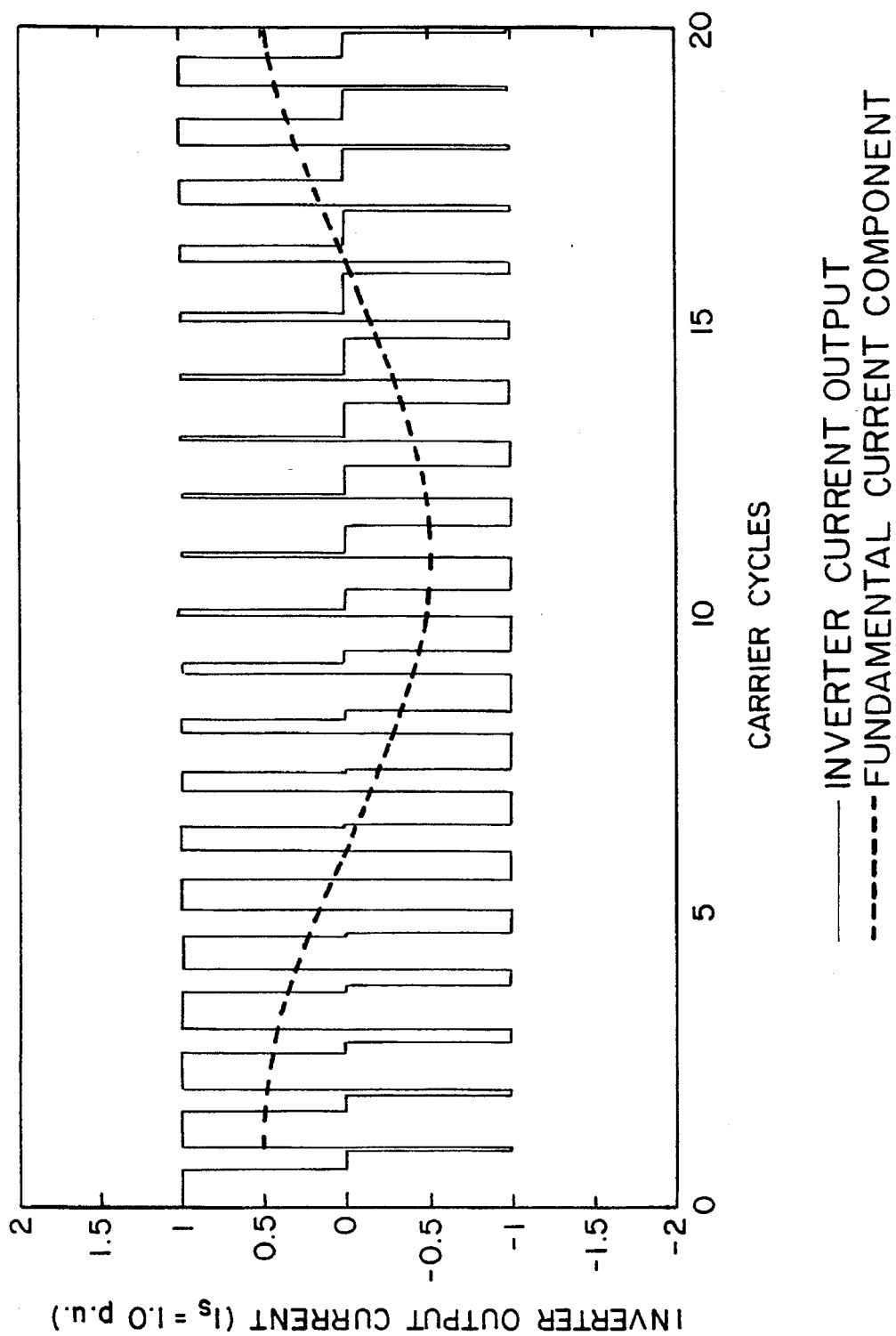
FIG. 14 is an illustrative diagram showing the inverter current output for one phase during the first mode of operation of the system of FIG. 1.

Controlling the width of the three time intervals controls the average current value. As shown in FIG. 14, low frequency current components in the inverter output may be synthesized by control of a sequence of these time intervals. For purposes of illustration, the fundamental component is superimposed.

Charge balance across the capacitors $C_1$, $C_2$ and $C_3$, dictates that, in the case of the load fundamental current being DC in the steady state, all the DC components must flow into the load. As expected, the portion of the load fundamental current which flows into the load is divided between the load and the capacitors in accordance with basic circuit laws. At the low load frequencies typically encountered using this switching strategy, the small terminal capacitors $C_1$, $C_2$ and $C_3$ actually shunt nearly all the current to the load. Hence, it is possible to provide DC or slowly varying currents of a controllable nature to the load.

Figure 13:
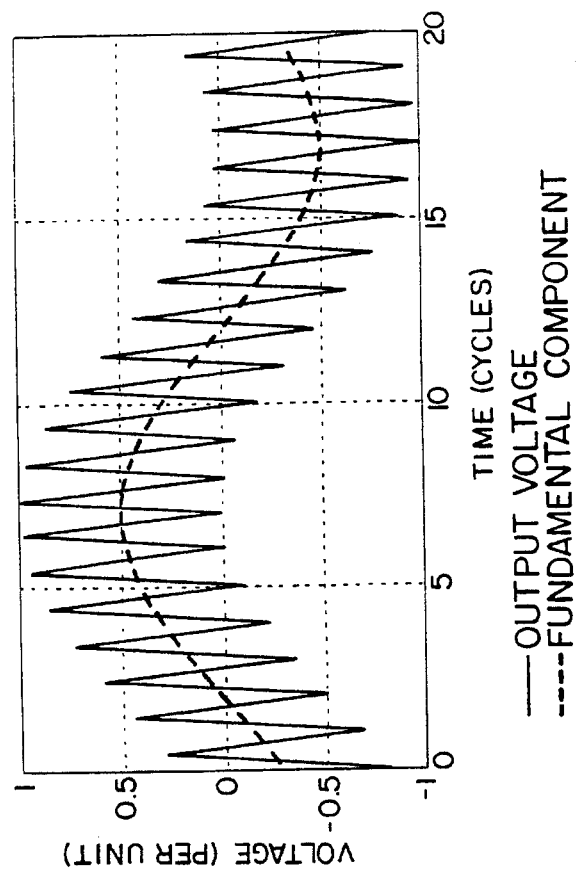
FIG. 13 is an illustrative diagram showing an exemplary output voltage waveform for one phase during the first mode of operation of the circuit of FIG. 1.

Carrier or switching frequency current is the dominant current component by design, due to the nature of the load, and also is by far the dominant current component in the capacitors. Consequently, line-to-line voltage waveforms, which are proportional to the integral of the capacitor currents, are essentially triangular at the carrier frequency, as illustrated in FIGS. 9 and 13.

In order to insure commutation of the devices $T_1$–$T_6$, line-to-line voltages must each have a pair of zero crossings per switching cycle. Unequal time intervals $t_1$, $t_2$, and $t_3$ mean that, though commutation may be realized, the average voltage over a carrier cycle is not necessarily zero. An example showing one fundamental period of one phase of an ideal line-to-line voltage waveform is shown in FIG. 13. A quick inspection and some simple geometry reveal that, if zero voltage crossings for commutation occur twice each switching cycle, the peak value of the fundamental voltage component must always be less than half the peak value of the overall waveform. In other words, if device voltage stress cannot safely exceed 1.0 per unit, then the load fundamental voltage peak may not exceed 0.5 per unit. If thyristors with peak voltage ratings greater than load peak voltage ratings are used, then the load fundamental peak voltage capacity is commensurately increased.

Three phase coupling does not adversely affect this relationship. The thyristor voltage is line-to-line voltage in this circuit topology. When one line-to-line voltage is at peak value, the other two are always well within the limits imposed by device ratings. This is illustrated in FIG. 9, where the most extreme line-to-line voltage stress experienced during a period of the fundamental cycle of one phase (in this case, $V_{ab}$) is the peak possible voltage condition which still maintains zero crossings required for commutation. Three phase symmetry dictates that the other two phases must have the same switching frequency amplitude but must have average values (i.e., approximate instantaneous value of the fundamental component) of half the amplitude and opposite sign. Although this is the extreme case, all voltage stresses are within ratings. Due to three phase symmetry, there are equivalent stresses on the other phases, in turn, at sixty degree intervals of the fundamental frequency. However, no voltage stress exceeds 1.0 per unit. Also, no fundamental voltage component has a peak value greater than 0.5 per unit.

Reverse recovery restraints dictate that the voltage remain in the proper polarity at least long enough to finish device commutation. Taking into consideration that a finite amount of negative voltage must be realized during reverse recovery, a reasonable ceiling on load fundamental voltage may be approximately 0.4 per unit or less.

An advantageous factor with the present inverter is the constant volts per Hertz ratio characteristic of inverters which drive a machine load at constant flux. A limitation of voltage to approximately 0.4 per unit translates into an equivalent limitation of fundamental frequency to approximately 0.4 per unit. For a synchronous machine, the same limitation necessarily applies to speed of rotation. Because rated slip frequencies are characteristically quite small, only a slightly smaller speed limit need be placed on an induction machine driven by the inverter 36 with this switching strategy.

The amplitude and phase of the load fundamental current component may be independently specified by the switching strategy in the first mode. Field excitation may also be independently controlled (including, preferably, being held to a constant value), thus meeting the three basic requirements for torque control. Application of torque control techniques with this switching strategy is probably easiest to understand by reference to the inverter terminal current waveforms shown in FIG. 8. If the time intervals $t_1$, $t_2$, and $t_3$ are not necessarily equal in length, then the average values of $i_A$, $i_B$, and $i_C$ over a carrier cycle may each be non-zero. These average currents may be computed using equations (1a), (1b), and (1c) given below. T is the carrier period, expressed in equation (1d) as the sum of time intervals $t_1$, $t_2$, and $t_3$. A superscript "s" indicates the stationary machine reference frame.

$$<i_A^s> = \frac{I_s}{T} (t_1 - t_3) \quad (1a)$$

$$<i_B^s> = \frac{I_s}{T} (t_2 - t_1) \quad (1b)$$

$$<i_C^s> = \frac{I_s}{T} (t_3 - t_2) \quad (1c)$$

$$1 = \frac{t_1}{T} + \frac{t_2}{T} + \frac{t_3}{T} \quad (1d)$$

Equations (1a), (1b), and (1d) are linearly independent for the input vector $[t_1\ t_2\ t_3]^T$. Thus, these three time intervals uniquely specify currents $<i_A>$ and $<i_B>$ and period T. ($<i_C>$ is just a linear combination of $<i_A>$ and $<i_B>$.) Each of these three time intervals is distinguished by an active switching state, i.e., energy is transferred to and from the capacitor-load combination.

It should be noted that this switching strategy uses three active states to specify the currents uniquely. Conventional space vector methods of specifying currents use two active states and a "zero" state. Unfortunately, there is really no useful, well-controlled, "zero" state available to this switching mode. Thus, this switching strategy employs a third active state instead of a "zero" state to specify the currents uniquely.

Equations (1a) through (1d) may be solved for $t_1$, $t_2$, and $t_3$, yielding equation (2) below:

$$\begin{bmatrix} t_1 \\ t_2 \\ t_3 \end{bmatrix} = \frac{T}{3 I_s} \begin{bmatrix} 1 & -1 & I_s \\ 1 & 2 & I_s \\ -2 & -1 & I_s \end{bmatrix} \begin{bmatrix} <i_A^s> \\ <i_B^s> \\ 1 \end{bmatrix} \quad (2)$$

Equation (2) may be modified to obtain equation (3) below, which confirms that the three time intervals are the sum of a balanced portion (T/3) and an imbalance which is a function of the currents.

$$\begin{bmatrix} t_1 \\ t_2 \\ t_3 \end{bmatrix} = \frac{T}{3} \begin{bmatrix} 1 \\ 1 \\ 1 \end{bmatrix} + \frac{T}{3 I_s} \begin{bmatrix} 1 & -1 \\ 1 & 2 \\ -2 & -1 \end{bmatrix} \begin{bmatrix} <i_A^s> \\ <i_B^s> \end{bmatrix} \quad (3)$$

Axis transformation and rotation, with no zero sequence component, may be expressed per equations (4a) and (4b) respectively:

$$\begin{bmatrix} <i_A^s> \\ <i_B^s> \\ <i_C^s> \end{bmatrix} = \begin{bmatrix} 1 & 0 \\ -1/2 & -\sqrt{3}/2 \\ -1/2 & \sqrt{3}/2 \end{bmatrix} \begin{bmatrix} <i_q^s> \\ <i_d^s> \end{bmatrix} \quad (4a)$$

$$\begin{bmatrix} <i_q^s> \\ <i_d^s> \end{bmatrix} = \begin{bmatrix} \cos(\theta - \theta_0) & -\sin(\theta - \theta_0) \\ \sin(\theta - \theta_0) & \cos(\theta - \theta_0) \end{bmatrix} \begin{bmatrix} <i_q^e> \\ <i_d^e> \end{bmatrix} \quad (4b)$$

Combining equations (3), (4a), and (4b) yields expressions for time intervals $t_1$, $t_2$, and $t_3$, given in equations (5a), (5b), and 5(c) below. Superscript 'e' indicates synchronous reference frame.

$$t_1 = \frac{T}{3} + \frac{T}{3 I_s} \left[ \frac{3}{2} \cos(\theta - \theta_0) + \frac{\sqrt{3}}{2} \sin(\theta - \theta_0) \right] i_q^e + \quad (5a)$$

$$\frac{T}{3 I_s} \left[ \frac{3}{2} \sin(\theta - \theta_0) + \frac{\sqrt{3}}{2} \cos(\theta - \theta_0) \right] i_d^e$$

$$t_2 = \frac{T}{3} + \frac{T}{3 I_s} [-\sqrt{3} \sin(\theta - \theta_0)] i_q^e + \quad (5b)$$

-continued $$t_3 = \frac{T}{3I_s}[-\sqrt{3}\cos(\theta-\theta_0)]i_d^e \quad (5c)$$

$$\frac{T}{3} + \frac{T}{3I_s}\left[-\frac{3}{2}\cos(\theta-\theta_0)+\frac{\sqrt{3}}{2}\sin(\theta-\theta_0)\right]i_q^e +$$

$$\frac{T}{3I_s}\left[\frac{3}{2}\sin(\theta-\theta_0)+\frac{\sqrt{3}}{2}\cos(\theta-\theta_0)\right]i_d^e$$

This control algorithm carried out within the controller 40 is illustrated in block diagram form in FIG. 15. For a synchronous machine, the q-axis current component in the synchronous reference frame is the torque component, and the d-axis current component in the synchronous reference frame is the flux component. Specifying command values for these, $i_q^{c*}$ and $i_d^{c*}$, respectively, forms a current command input vector. It is possible to specify a normalized current command $(i_q^{c*}/I_s)$ up to 0.667 ideally, though ordinary thyristor device limitations (e.g., recovery time, etc.) limit practical current commands considerably.

For direct measurement, angular position θ may be determined and axis transformation and rotation yields a three phase current command vector. Knowing link current $I_s$ and carrier (switching) period T, a command value of each time interval command $t_1^*$, $t_2^*$, and $t_3^*$ may be calculated. For more efficient calculation, the three phase current command vector need not be explicitly calculated. Current applied to the switching devices for these time intervals develops the required torque. It is assumed that the fundamental current which flows through the capacitors, bypassing the load, is negligible due to the small capacitor value and the low frequency, constant volts per Hertz operation.

The foregoing accomplishes vector control of torque. Field orientation is easily accomplished by setting $i_d^{c*}$ to zero for a synchronous machine and to an appropriate value for an induction machine. Operation under space angle control may also be accomplished. The magnitude and phase of the output current may be adjusted to obtain any desired power factor at fundamental frequency.

The first or three step switching mode described above is well suited to providing power to drive a motor load from stand-still to low speed, typically up to a maximum of about 40% rated speed. The triangular voltage waveforms generated as discussed above may be modulated to obtain a low frequency fundamental voltage component in each of the three phases, as illustrated in FIG. 13 for one phase. When applied to a machine load, the voltage produces a current and a torque which are free of low frequency harmonic ripple. As noted above, commutation is guaranteed if the voltage in each phase experiences zero crossings during each switching cycle. The effect of this requirement for commutation is to restrict the peak fundamental voltage component to less than half of the overall peak voltage, as is apparent from FIG. 13. The inverter current output per phase is illustrated in FIG. 14.

After the first, three-step switching mode is utilized to drive the motor load up from stand-still to a low speed operation, e.g., 40% of rated speed, the second mode in accordance with the invention may be applied to drive the motor up to its desired operating speed including the speed range commonly termed "constant horsepower range". Any speed in which the first mode operates is available for transition from the first mode to the second mode. However, because the second mode contains low frequency harmonic ripple components in both current and torque, it is more desirable to accomplish transition at as high a speed as practical.

The basic building block of the second mode is a switching cycle consisting of four sequential states that impress a controllable non-zero average voltage across the load. By assembling a series of these "four step" groups, a voltage waveform can be synthesized. The resulting fundamental terminal voltage component has controllable frequency, amplitude, and phase. This modulation method extends the speed range up to approximately 80% of rated speed while meeting the dual requirements of peak voltage stress and commutation.

It is easier to understand the method if it is first explained assuming a no-load condition. No-load means that the capacitors alone are drawing current from the inverter. Let the initial condition be as follows: voltage between lines 37 and 38 (b and c) is zero with $V_{ab}>0$, $V_{ca}<0$, and current $I_B=I$, $I_C=-I$, $I_A=0$. This means that devices $T_2$ and $T_6$ are conducting. Space vector techniques are particularly helpful in understanding how this method works; the initial condition is the point labeled "1" on FIG. 16.

Under these initial conditions, the tip of the voltage locus moves in the direction of the applied current. This direction is upward on the diagram, toward the point labelled "2". To gate device $T_4$ into conduction, $V_{ca}<0$ is necessary. This already being the case, $T_4$ may be gated at any arbitrary point "2". This switching of the output current causes the terminal voltage to begin to integrate toward point "3". Eventually, $V_{ab}$ experiences a zero crossing. With $V_{ab}<0$, devices $T_1$ and $T_5$ may be gated at a point labeled "3". The voltage moves from point "3" toward point "4", retracing its path. (For clarity of diagram, the next two steps are shown in FIG. 17). If $V_{ca}<0$, which has been the case throughout this example, device $T_3$ may be gated an any arbitrary point "4". With $T_3$ and $T_5$ conducting, the voltage locus moves toward point "5". Eventually, a zero crossing occurs and it is possible to gate $T_2$ and $T_6$ at an arbitrary point "5", which restores the initial switching condition. The voltage locus then rises to a $V_{bc}$ zero crossing, thus matching the initial voltage conditions and completing the switching cycle. FIGS. 23–30 show the switching sequence and the waveforms generated in a manner similar to FIGS. 2–7 for the three step mode.

By judicious choice of points "1" and "4", the voltage locus can either be closed or made to "ratchet" in or out. A review of the switching cycle shows that each device is gated exactly once. The primary advantage of this method is that the voltage locus need not surround the origin for guaranteed commutation.

A time domain representation of the terminal voltage over a switching cycle (assuming a voltage locus that closes on itself), is shown in FIG. 18. Points labeled on the time axis in FIG. 18 correspond to points labeled in space in FIGS. 16 an 17. Over a switching cycle at no load and negligible voltage to assure commutation, average voltages for $V_{ab}$, $V_{bc}$, and $V_{ca}$ are 0.4375, 0.4375, and −0.8750 per unit. For reference, the greatest voltage stress, $V_{ca}$ in this case, is the base voltage value. Inspection of voltage $V_{ca}$ reveals a time domain manifestation of the primary advantage of this method: Commutation occurs without a zero crossing for $V_{ca}$.

Figure 19:
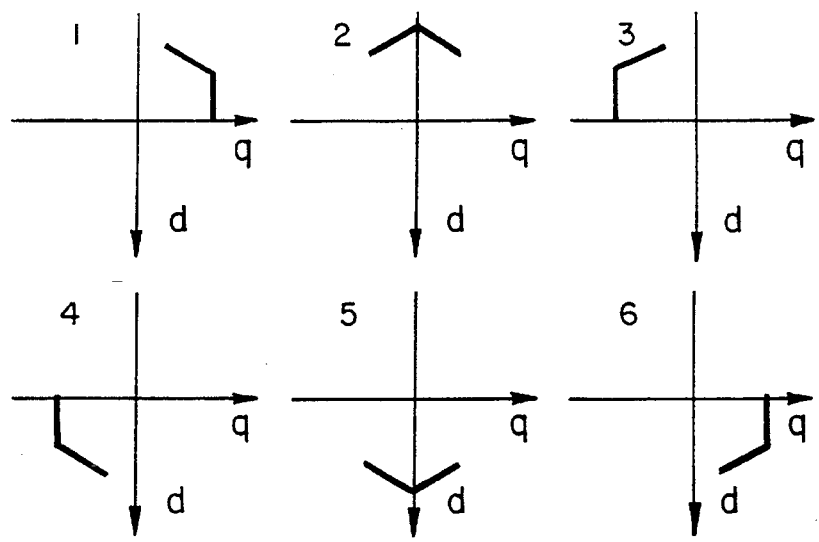
FIG. 19 is an illustrative diagram using space vector format of the six possible cases for voltage loci in the second mode.
Figure 20:
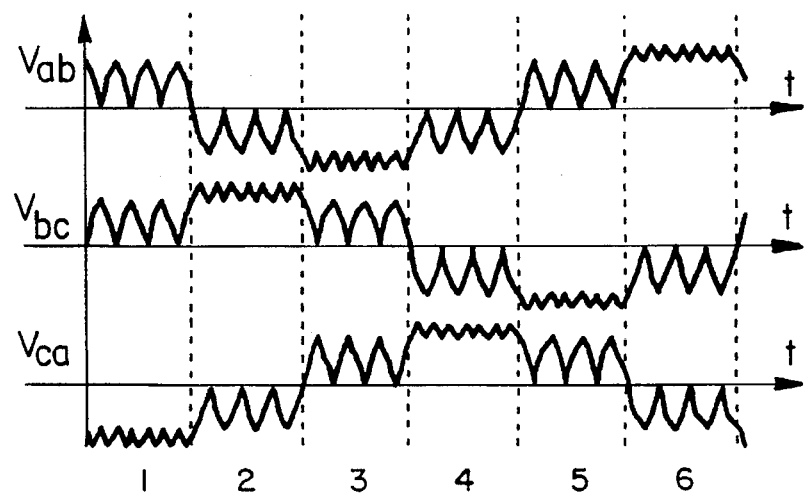
FIG. 20 is an illustrative diagram illustrating an underlying six step fundamental voltage waveform in the second mode.

Using this "four step" sequence as a building block, a low frequency waveform may be assembled. There are six possible combinations of the "four step" sequence, giving six "corners" wherein to switch. These six possibilities are illustrated in FIG. 19. If the waveform developed in the preceding discussion is associated with "corner" 1, then "corners" 2 through 6 are sixty degrees apart in sequence. Transition between these "corners" is quite simple: leaving thyristors in a conducting state beyond the anticipated zero crossing automatically places the voltage locus in a portion of an adjacent "corner". In other words, adjacent "corners" intersect at the line-to-line voltage zero crossings. Arranging "corners" in cardinal sequence (while dithering in each in turn) gives a voltage waveform with a six step character, as shown in FIG. 20. Even while allowing for some minimum voltage travel past the zero crossings to insure commutation, it is possible to develop a switching voltage waveform that has a peak fundamental value above 80% of overall peak value. For rated flux operations, this translates into a speed limit of over 80% of rated value.

Figure 21:
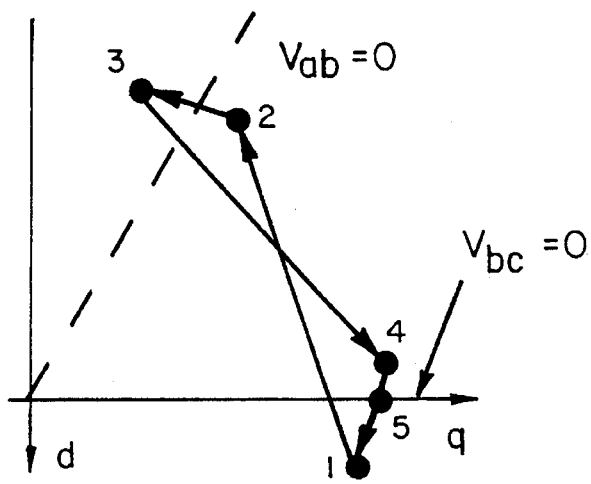
FIG. 21 is an exemplary space vector representation of the output voltage locus in the second mode when load is applied.

Adding a load does not alter the sequence of switching states chosen in building a "four step" voltage waveform. Rather, the effect of load is to change both the magnitude and orientation of the capacitor current space vectors. As already seen in the three step case under load, the tip of the voltage vector moves in the direction of capacitor current and at a velocity proportional to it. Consequently, the voltage locus is distorted as illustrated in FIG. 21.

Figure 22:
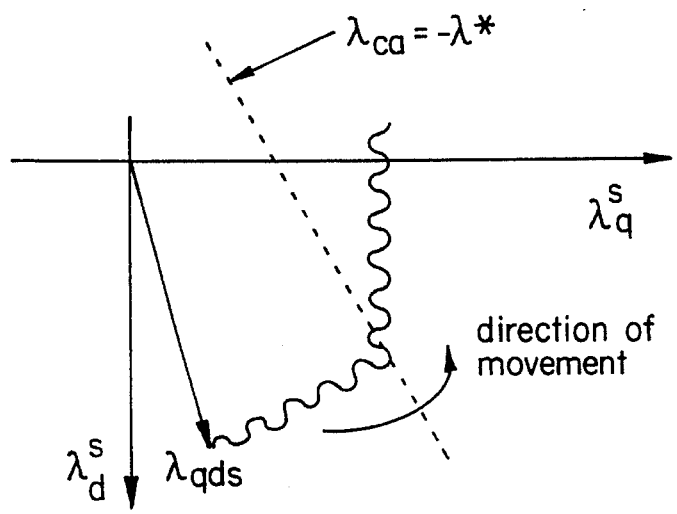
FIG. 22 is a space vector representation of a method whereby transition is indicated from one (of six) steps to the next in the second mode.

A direct self control method determines the transition between each of the underlying six steps. From the machine's point of view, the terminal capacitance indeed gives the applied excitation a voltage source character. The six available "corners" designated as building blocks constitute six active voltage vectors with controllable amplitude. The following example illustrates this flux control. Consider the terminal voltage locus to be the closed trace shown in FIG. 21. From the initial β-flux values, transformation yields an initial stator flux vector in the dq reference as shown in FIG. 22. Integration of the voltage over time causes the tip of the stator flux vector to move up and to the right. Eventually, the flux value on phase decreases to a reference value (which is, in this particular case, negative). The voltage may then be allowed to move into the adjacent "corner" (denoted corner 2 in FIG. 19). Now the stator flux vector will move upward in response to the applied voltage. By taking advantage of the six-flod symmetry, a hexagonal flux locus appears. The reference value determines the amplitude of the flux vector. Simply specifying this command yields operations at a corresponding flux level.

It is also possible to employ synchronous Pulse Width Modulation (PWM) to determine the transition between each of the six underlying steps. This method, which is quite common in certain PWM Voltage Source Inverters (PWM-VSI) and GTO based Current Source Inverters (GTO-CSI) merely involves selecting a number of pulses per cycle that is an integer multiple of the fundamental frequency. Continuous frequency range can be obtained by adjusting the amount of negative voltage allowed during device recovery. Of the two methods, the synchronous PWM method of selecting transition between steps is preferred due to its negligible subharmonic content.

Switching combinations for the second mode in which a four-step switching sequence is used are given in Table 2 below. Again, the numbers in the table indicate the thyristors that are turned on; e.g., the numbers "62" mean that thyristors $T_6$ and $T_2$ are turned on. The time periods are (referenced to FIGS. 16 and 17): $t_1$ between point 1 (point 5 of the previous cycle) and point 2, $t_1$ between points 2 and 3, $t_3$ between points 3 and 4, and $t_4$ between points 4 and 5.

TABLE 2

| SWITCHING GROUP | TIME PERIOD IN SEQUENCE | | | |
|---|---|---|---|---|
| | $t_1$ | $t_2$ | $t_3$ | $t_4$ |
| α | 62 | 24 | 51 | 35 |
| β | 24 | 43 | 16 | 51 |
| γ | 43 | 35 | 62 | 16 |
| δ | 35 | 51 | 24 | 62 |
| ε | 51 | 16 | 43 | 24 |
| ζ | 16 | 62 | 35 | 43 |

In the four-step switching sequence set forth in Table 2, the switching sequence cycles continuously as: $t_1 \to t_2 \to t_3 \to t_4 \to t_1 \to \ldots$. There are six possible groups as illustrated in FIG. 19, which can be combined to form the fundamental frequency waveform as shown in FIG. 20. The fundamental frequency waveform is built by cycling in six steps between groups, i.e.: $\alpha \to \beta \to \gamma \to \delta \to \epsilon \to \zeta \to \alpha \to \ldots$, or the reverse of that sequence. Transition between groups is accomplished by overlapping time periods in two groups with identical devices conducting. For example, it is seen from Table 2 that the switching combination in the β group at time $t_2$ is 43 and that the switching combination for the γ group at time $t_1$ is 43. Thus, when a transition between groups β and γ is to occur, the transition may take place during time period $t_2$ for group β, which becomes time period $t_1$ for group γ.

Figure 24:
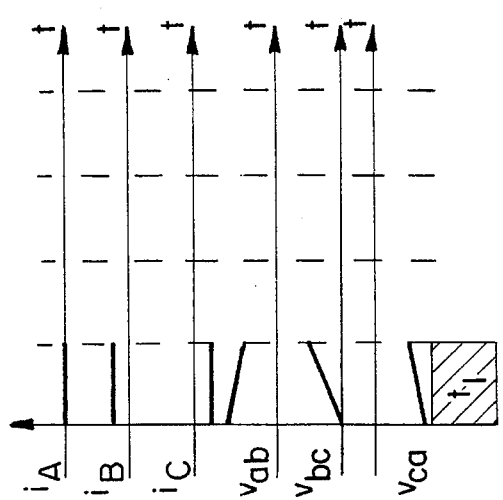
FIGS. 24, 26, 28, and 30 are illustrative diagrams showing the current and voltage waveforms in the four step sequence of the second mode for the circuit diagrams of FIGS. 23, 25, 27 and 29, respectively.
Figure 26:
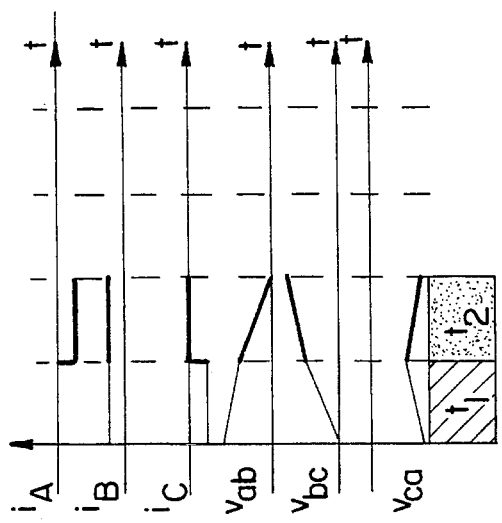
Figure 23:
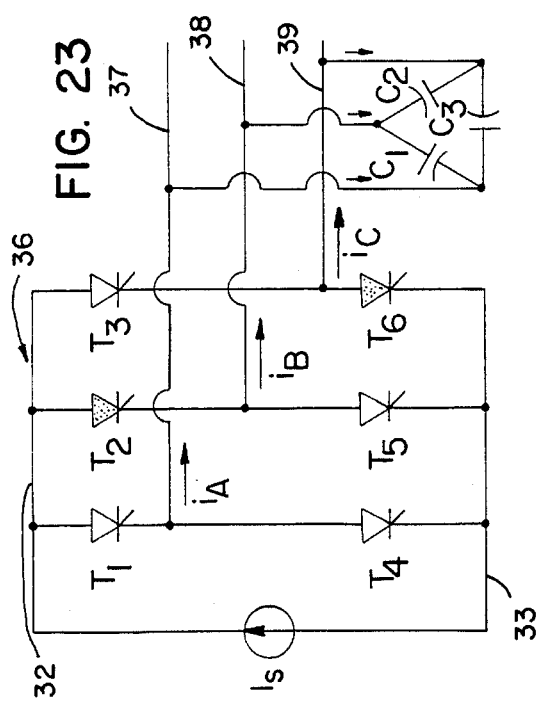
FIGS. 23, 25, 27, and 29 are simplified circuit schematic diagrams illustrating the sequence of conducting states for one four step switching cycle in the second mode.
Figure 25:
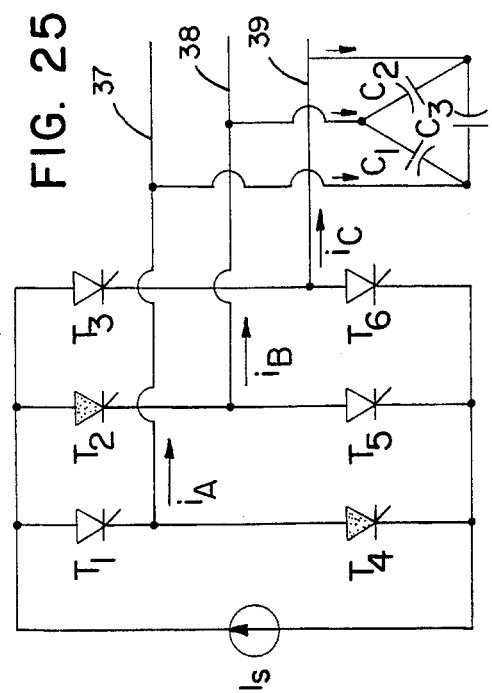
Figure 28:
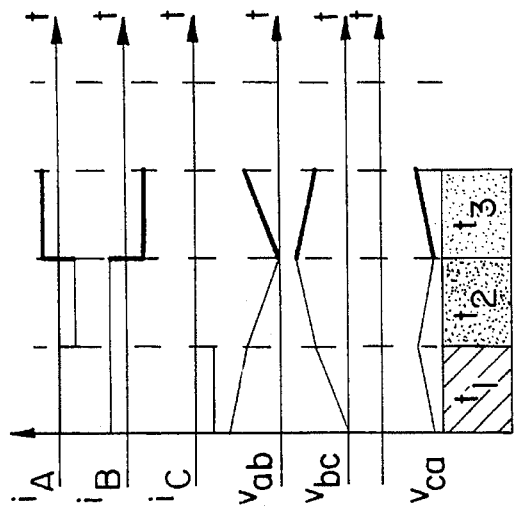
Figure 30:
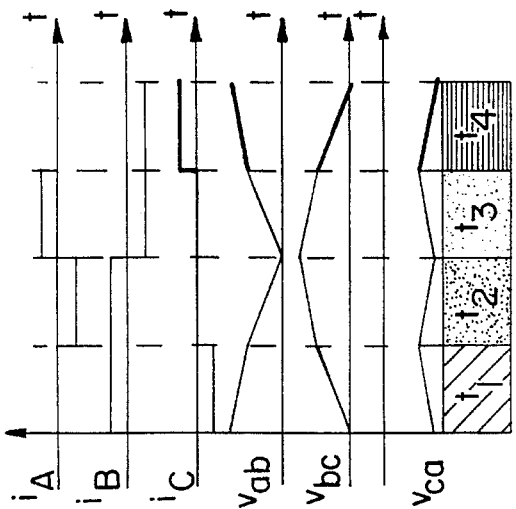
Figure 27:
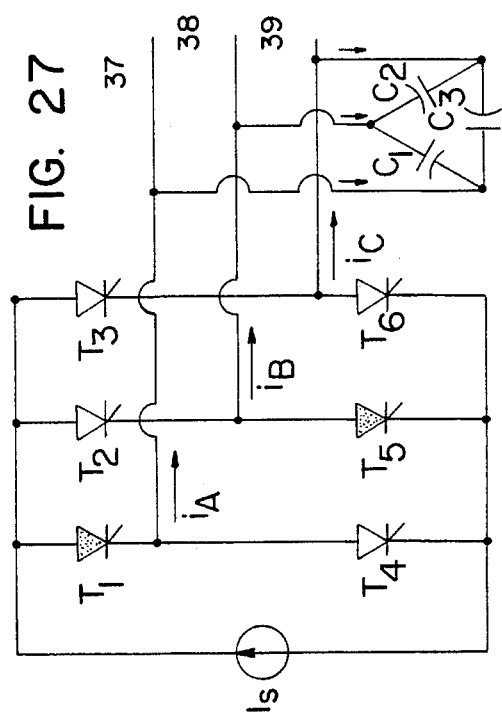
Figure 29:
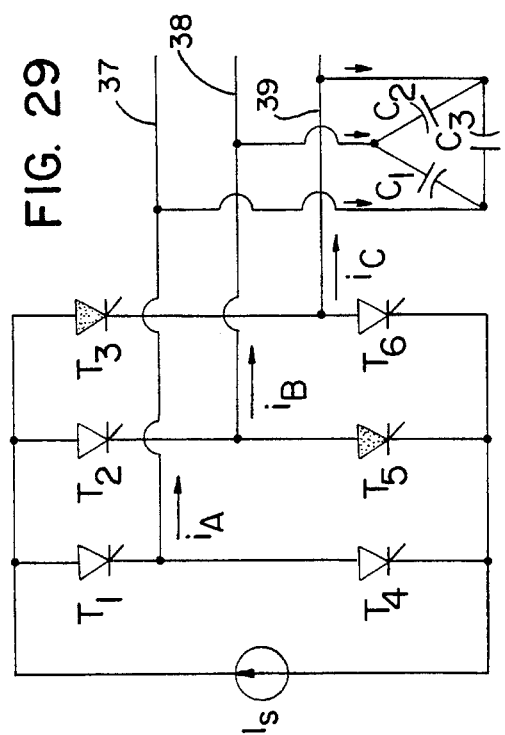

The combinations of thyristors conducting in one of the six possible four step sequences is illustrated by the circuit diagrams of FIGS. 23, 25, 27 and 29. The current and voltage waveforms corresponding to these switching combinations for the thyristors are shown in FIG. 24 for the state of FIG. 23, FIG. 26, for the state of FIG. 25, FIG. 28 for the state of FIG. 27, and FIG. 30 for the state of FIG. 29. It is seen that in each of the six steps, the switching cycle has four time periods wherein in each time period a different pair of thyristors from different sets of thyristors are triggered to conduct. In each time period current flows either in a selected first or a selected second of the output lines and through the third output line in all time periods, with current flowing in one direction alternately in the first and second output lines during the first two time periods, and with current flowing in the opposite direction alternately in the first and second output lines during the third and fourth time periods. The voltages across the first and third output lines and across the second and third output lines reach zero in each switching cycle to provide commutation of the inverter thyristors, but the voltage across the first and second output lines does not reach zero during the switching cycle.

In summary, after the controller 40 has determined that the intermediate speed (frequency) has been reached, typically in response to an external signal such as the signal on the line 45 indicating motor speed, it thereafter applies control signals to the thyristors of the inverter to provide a switching cycle for the thyristors having four time periods at a switching frequency higher than a desired fundamental frequency (e.g., 60 Hz), and switches the thyristors in six steps, each step having a different four-step switching cycle, over a fundamental frequency cycle.

Figure 31:
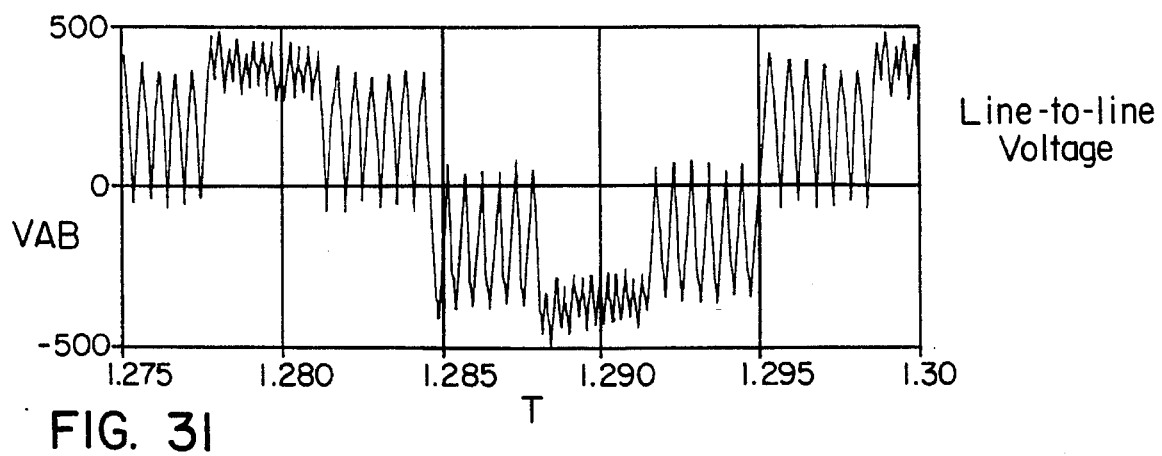
FIG. 31 is an illustrative waveform of one phase voltage at the output of the power conversion system of FIG. 1 when operating in the second mode.
Figure 32:
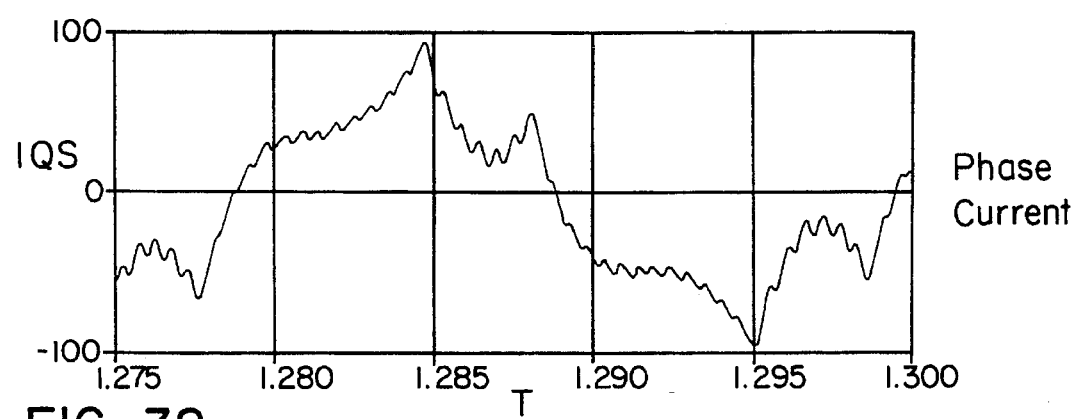
FIG. 32 is an illustrative waveform of the current for one phase for the power conversion system of FIG. 1 when operating in the second mode.
Figure 33:
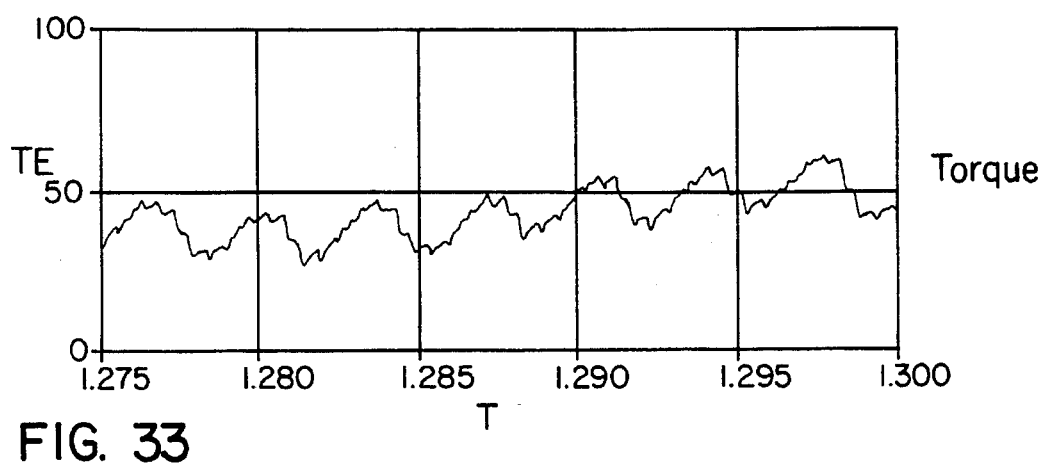
FIG. 33 is an illustrative waveform of torque over time obtained with the power conversion system of FIG. 1 when operating in the second mode.

The output voltage waveform $V_{ab}$ across lines 37 and 38 in the second mode is illustrated in FIG. 31. In such a voltage waveform, the peak fundamental voltage component is about 80% of overall peak thyristor voltage stress. In other words, for constant flux operation, rated voltage and speed is obtainable with only a 25% voltage overrating for the thyristors. The motor load may also be driven at a higher speed in a field weakening manner. Illustrative graphs of the phase current and the torque obtained with the voltage waveform of FIG. 31 are shown in FIGS. 32 and 33, respectively.

Figure 34:
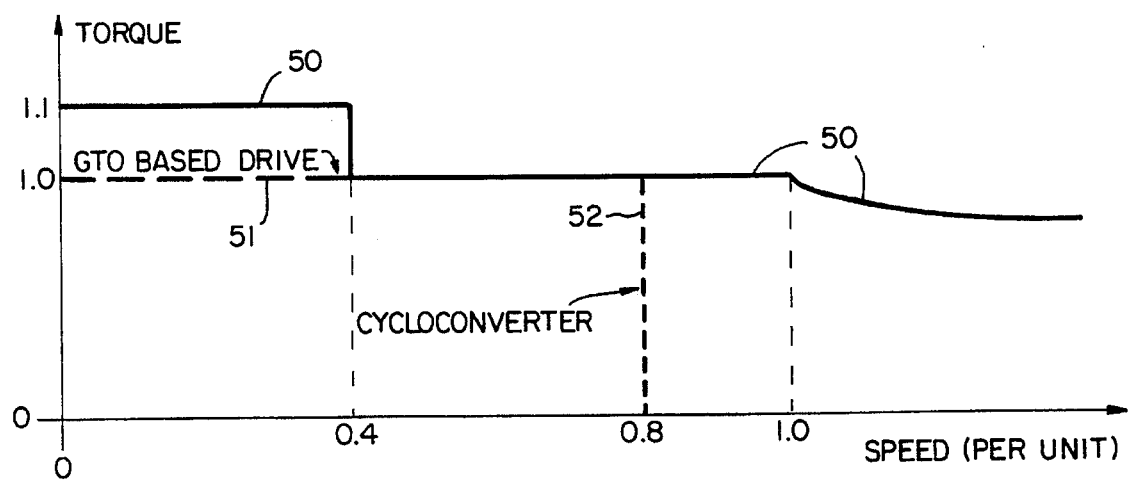
FIG. 34 is a schematic diagram illustrating the torque versus speed output obtainable with the power conversion system of FIG. 1 connected to a synchronous or induction motor.

A torque-speed curve for the power conversion system of the present invention is illustrated at 50 in FIG. 34. In the second mode, the load current may not exceed half of the DC link current for stability reasons. Hence, the torque-speed curve is normalized to the torque limit that results from this constraint, as extended for 25% voltage overrating. This is a uniquely shaped curve, with more torque available in the low frequency first mode, and constant horsepower range available in the second mode. A torque speed curve at low speed for a GTO based drive with comparable output ratings is also superimposed in FIG. 34 as the dashed line 51. A characteristic torque-speed curve for a cycloconverter system with similar output ratings is also superimposed, and the speed ceiling which is typical of cycloconverters is illustrated by the dashed line 52. Thus, it is evident that the power conversion system of the present invention provides a speed-torque characteristic which provides advantages over GTO-based drives and cycloconverter drives, with particular advantages at low speeds.

Direction of rotation and, hence, polarity of the dc component of the link voltage are not restricted to a positive value. Rather, the system may have its rotation reversed on command in either the first mode or the second mode. The electrical effect of this is to reverse the polarity of the dc link voltage at the inverter terminals. This implies that power flow may be reversed in so doing. Consequently, the present invention will operate in a regenerative, or rectifier, fashion in either of the two modes. While the preferred mode for rectifier operation is the three step mode due to its lack of significant current harmonics, device peak voltage ratings may dictate that the four step mode be used in cases where the voltage penalties of the three step mode are too severe.

It is understood that the invention is not confined to the embodiments set forth herein as illustrative, but embraces all such forms thereof as come within the scope of the following claims.

What is claimed is:

1. A power conversion system for three phase motor drive operation, comprising:
   (a) DC link lines to which DC input current can be applied;
   (b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;
   (c) capacitors connected across the three output lines of the inverter;
   (d) a motor connected to the output lines of the inverter;
   (e) control means, connected to the inverter thyristors, for providing firing signals to the thyristors in a first mode to provide a switching cycle at a switching frequency which is higher than a desired fundamental frequency in each of the three phase output lines, the switching cycle having three time periods wherein in each time period a different pair of thyristors from different sets of thyristors are triggered to conduct, the on-time of each of the pairs of thyristors selected to provide an increase or decrease of the average phase voltage output on the output lines to provide time varying average phase voltages at the desired fundamental frequency while providing a zero crossing for each phase voltage in each switching cycle to provide commutation of the inverter thyristors, the control means receiving a signal indicative of the position and speed of the motor, and the control means further including means for determining when the motor has reached a selected intermediate speed, and thereafter applying control signals to the thyristors of the inverter in a second mode to provide a switching cycle for the thyristors having four time periods at a switching frequency higher than a desired fundamental frequency, and for switching the thyristors to provide a six step three phase output on the output lines at a fundamental frequency cycle with a different firing sequence for pairs of thyristors within each switching cycle.

2. The power conversion system of claim 1 wherein in the second mode in each time period current flows either in a first or a second of the output lines and through the third output line in all time periods, with current flowing in one direction alternatively in the first and second output lines during the first two time periods, and with current flowing in the opposite direction alternately in the first and second output lines during the third and fourth time periods, the voltages across the first and third output lines and across the second and third output lines reaching zero in each switching cycle to provide commutation of the invert thyristors, and wherein the voltage across the first and second output lines does not reach zero during the switching cycle.

3. The power conversion system of claim 1 further including a rectifier having AC input lines and comprised of controlled rectifying devices connected across the input lines, the rectifying devices connected to the DC link lines of the inverter to provide rectified DC voltage to the DC link lines when AC power is provided to the input lines of the rectifier, and including a DC link inductor connected in one of the DC link lines between the rectifier and the inverter.

4. The power conversion system of claim 3 wherein the rectifying devices of the rectifier are thyristors and including a controller controlling the switching of the thyristors to maintain a desired DC link current.

5. A power conversion system for three phase motor drive operation, comprising:
   (a) a rectifier having AC input lines to which AC power can be applied, the rectifier comprising rectifying devices connected to DC link lines to provide rectified DC voltage to the DC link lines when AC power is provided to the input lines of the rectifier, and including a DC link inductor connected in one of the DC link lines, and rectifier controlled to provide a desired DC link current;
   (b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;
   (c) capacitors connected across the three output lines of the inverter;
   (d) a motor connected to the output lines of the inverter;
   (e) control means, connected to the inverter thyristors, for providing firing signals to the thyristors in a first mode to provide a switching cycle at a switching frequency which is higher than a desired fundamental frequency in each of the three phase output lines, the switching cycle having three time periods wherein in each time period a different pair of thyristors from different sets of thyristors are triggered to conduct, the on-time of each of the pairs of thyristors selected to provide an increase or decrease of the average phase voltage output on the output lines to provide time varying average phase voltages at the desired fundamental frequency while providing a zero crossing for each phase voltage in each switching cycle to provide commutation of the inverter thyristors, the control means receiving a signal indicative of the position and speed of the motor, and the control means further including means for determining when the motor has reached a selected intermediate speed, and thereafter applying control signals to the thyristors of the inverter in a second mode to provide a switching cycle for the thyristors having four time periods at a switching frequency higher than a desired fundamental frequency, and for switching the thyristors to provide a six step three phase output on the output lines at a fundamental frequency cycle with a different firing sequence for pairs of thyristors within each switching cycle.

6. The power conversion system of claim 5 wherein in the second mode in each time period current flows either in a first or a second of the output lines and through the third output line in each time period, with current flowing in one direction alternately in the first and second output lines during the first two time periods, and with current flowing in the opposite direction alternatively in the first and second output lines during the third and fourth time periods, the voltages across the first and the second and third output lines reaching zero in each switching cycle to provide commutation of the inverter thyristors, wherein the voltage across the first and second output lines does not reach zero during the switching cycle.

7. The power conversion system of claim 5 wherein the rectifying devices of the rectifier are thyristors and including a controller controlling the switching of the thyristors to maintain a desired DC link current.

8. A power conversion system for three phase motor drive operation, comprising:

(a) a rectifier having AC input lines, rectifying devices connected across the input lines, the rectifying devices connected to DC link lines to provide rectified DC voltage to the DC link lines when AC power is provided to the input lines of the rectifier, and including a DC link inductor connected in one of the DC link lines, the rectifier controlled to provide a desired DC link current;

(b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;

(c) capacitors connected across the three output lines of the inverter;

(d) a motor connected to the output lines of the inverter;

(e) control means, connected to the inverter thyristors and receiving a signal indicative of the speed and position of the motor, for providing firing signals to the thyristors of the inverter in a first mode to provide a switching cycle at a switching frequency which is higher than a desired fundamental frequency in each of the three phase output lines to operate the motor, the switching cycle having three time periods wherein in each time period a different pair of thyristors from different sets of thyristors is triggered to conduct, the on-time of each of the pairs of thyristors selected to provide an increase or decrease of the average phase voltage output on the output lines to provide time varying average phase voltages at the desired fundamental frequency while providing a zero crossing for each phase voltage in each switching cycle to provide commutation of the inverter thyristors, the control means further including means for determining when the motor has reached a selected intermediate speed, and applying control signals to the thyristors of the inverter in a second mode above the selected speed to provide six step three phase output power from the inverter to the motor at a desired fundamental frequency with a different firing sequence for pairs of thyristors within each switching cycle.

9. The power conversion system of claim 8 wherein in the second mode the control means provides control signals to the thyristors of the inverter to provide a switching cycle for the thyristors having four time periods at a switching frequency higher than a desired fundamental frequency, and for switching the thyristors to provide a six step three phase output on the output lines at a fundamental frequency cycle with a different firing sequence for pairs of thyristors within each switching cycle.

10. The power conversion system of claim 9 wherein in the second mode in each time period current flows either in a first or a second of the output lines and through the third output line in each time period, with current flowing in one direction alternately in the first and second output lines during the first two time periods, and with current flowing in the opposite direction alternatively in the first and second output lines during the third and fourth time periods, the voltages across the first and third output lines and across the second and third output lines reaching zero in each switching cycle to provide commutation of the inverter thyristors, wherein the voltage across the first and second output lines does not reach zero during the switching cycle.

11. A power conversion system for three phase motor drive operation, comprising:

(a) DC link lines to which DC input current can be applied;

(b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;

(c) capacitors connected across the three output lines of the inverter;

(d) control means, connected to the inverter thyristors, for providing signals to the thyristors to provide a switching cycle at a switching frequency which is higher than a desired fundamental frequency in each of the three phase output lines, the switching cycle having four time periods wherein in each time period a different pair of thyristors from different sets of thyristors are triggered to conduct, wherein in each time period current flows either in a selected first or a selected second of the output lines and through the third output line in all time periods, with current flowing in one direction alternately in the first and second output lines during the first two time periods, and with current flowing in the opposite direction alternately in the first and second output lines during the third and fourth time periods, the voltages across the first and third output lines and across the second and third output lines reaching zero in each switching cycle to provide commutation of the inverter thyristors, and wherein the voltage across the first and second output lines does not reach zero during the switching cycle.

12. The power conversion system of claim 11 wherein the control means switches the thyristors to provide a six step three phase output on the output lines at a fundamental frequency cycle with a different firing sequence for pairs of thyristors within each switching cycle for each phase at the desired fundamental frequency.

13. The power conversion system of claim 12 wherein the control means provides firing signals to the inverter thyristors to provide a six step three phase output on the output lines at a fundamental frequency cycle, each of the six steps having a four time period switching cycle which differs from the four time period switching cycle in each of the other steps by the output lines which are selected as the first and second output lines in which current alternately flows or in the direction of current flow in the selected first and second output lines.

14. The power conversion system of claim 11 further including a rectifier having AC input lines and comprised of controlled rectifying devices connected across the input lines, the rectifying devices connected to the DC link lines of the inverter to provide rectified DC voltage to the DC link lines when AC power is provided to the input lines of the rectifier, and including a DC link inductor connected in one of the DC link lines between the rectifier and the inverter, the rectifier controlled to provide a desired DC link current.

15. The power conversion system of claim 14 wherein the rectifying devices of the rectifier are thyristors and including a controller controlling the switching of the thyristors to maintain a desired DC link current.

16. A power conversion system for three phase motor drive operation, comprising:

(a) a rectifier having AC input lines to which AC power can be applied, the rectifier comprising rectifying devices connected to DC link lines to provide rectified DC voltage to the DC link lines when AC power is provided to the input lines of the rectifier, and including a DC link inductor connected in one of the DC link lines, the rectifier controlled to provide a desired DC link current;

(b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;

(c) capacitors connected across the three output lines of the inverter;

(d) control means, connected to the inverter thyristors, for providing signals to the thyristors to provide a switching cycle at a switching frequency which is higher than a desired fundamental frequency in each of the three phase output lines, the switching cycle having four time periods wherein in each time period a different pair of thyristors from different sets of thyristors are triggered to conduct, wherein in each time period current flows either in a selected first or a selected second of the output lines and through the third output line in all time periods, with current flowing in one direction alternately in the first and second output lines during the first two time periods, and with current flowing in the opposite direction alternately in the first and second output lines during the third and fourth time periods, the voltages across the first and third output lines and across the second and third output lines reaching zero in each switching cycle to provide commutation of the inverter thyristors, and wherein the voltage across the first and second output lines does not reach zero during the switching cycle.

17. The power conversion system of claim 16 wherein the control means switches the thyristors to provide a six step three phase output on the output lines at a fundamental frequency cycle with a different firing sequence for pairs of thyristors within each switching cycle for each phase at the desired fundamental frequency.

18. The power conversion system of claim 16 wherein the control means provides firing signals to the inverter thyristors to provide a six step three phase output on the output lines at a fundamental frequency cycle, each of the six steps having a four time period switching cycle which differs from the four time period switching cycle in each of the other steps by the output lines which are selected as the first and second output lines in which current alternately flows or in the direction of current flow in the selected first and second output lines.

19. The power conversion systems of claim 16 wherein the rectifying devices of the rectifier are thyristors and including a controller controlling the switching of the thyristors to maintain a desired DC links current.

20. A method of providing controlled power to a three phase load comprising the steps of:

(a) providing a three phase inverter connected across DC link lines to which DC input current is provided, the inverter formed of at least six thyristors which require reverse voltage commutation to turn off connected in a bridge configuration having three sets of two thyristors connected in series between the DC link lines, with three output lines connected between the series connected thyristors in each set, and capacitors connected across the three output lines of the inverter, and connecting the output lines of the inverter to a load;

(b) switching the thyristors to provide a switching cycle at a switching frequency which is higher than a desired fundamental frequency in each of the three phase output lines, the switching cycle having four steps in a sequence which include the steps of firing a first pair of thyristors during a first time period to provide current in one direction to selected first of the output lines, firing a second pair of thyristors from a different set of thyristors during a second time period to provide current in one direction to a selected second of the output lines, firing a third pair of thyristors from a different set of thyristors during a third time period to provide current in the opposite direction to the first output line, and firing a fourth pair of thyristors from a different set of thyristors during a fourth time period to provide current in the opposite direction to the second output line, passing current from the first and second output lines to the third output line in all time periods, the voltages across the first and third output lines and across the second and third output lines reaching zero in each switching cycle to commutate the inverter thyristors, and wherein the voltage across the first and second output lines does not reach zero during the switching cycle.

21. The method of claim 20 including the steps of switching the thyristors to provide a six step three phase output on the output lines at a fundamental frequency cycle, wherein each of the six steps comprising the steps of switching the thyristors in the four step switching cycle, and wherein the switching cycle in each of the six steps differs from the switching cycle in the other steps by the output lines which are selected as the first and second output lines or in the direction of current flow in the selected first and second output lines.

22. A power conversion system for three phase motor drive operation, comprising:

(a) DC link lines to which DC input current can be applied;

(b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;

(c) capacitors connected across the three output lines of the inverter;

(d) control means, connected to the inverter thyristors, for providing signals to the thyristors to provide a six step cycle of output power at a selected fundamental frequency on the output lines, each of the fundamental frequency cycle steps including a switching cycle at a switching frequency which is higher than a fundamental frequency in each of the three phase output lines, the switching cycle having four time periods wherein in each time period a different pair of thyristors from different sets of thyristors are triggered to conduct, wherein in each time period current flows either in a selected first or a selected second of the output lines and through the third output line in all time periods, with current flowing in one direction alternately in the first and second output lines during the first two time periods, and with current flowing in the opposite direction alternately in the first and second output lines during the third and fourth time periods, the voltages across the first and third output lines and across the second and third output lines reaching zero in each switching cycle to provide commutation of the inverter thyristors, and wherein the voltage across the first and second output lines does not reach zero during the switching cycle, each step of the fundamental frequency cycle having a switching cycle which differs from the switching cycle in each other fundamental frequency cycle by the output lines which are selected as the first and second output lines or by the direction of current flow in the selected first and second output lines.

23. A power conversion system for three phase motor drive operation, comprising:

(a) a rectifier having AC input lines to which AC power can be applied, the rectifier comprising rectifying devices connected to DC link lines to provide rectified DC voltage to the DC link lines when AC power is provided to the input lines of the rectifier, and including a DC link inductor connected in one of the DC link lines, the rectifier controlled to provide a desired DC link current;

(b) a three phase inverter connected across the DC link lines, the inverter formed of at least six gate controlled thyristors which require reverse voltage commutation to turn off connected in a bridge configuration with three sets of two thyristors connected in series between the DC link lines, and having three output lines, each one of the output lines connected between the series connected thyristors in a respective one of the sets;

(c) capacitors connected across the three output lines of the inverter;

(d) control means, connected to the inverter thyristors, for providing signals to the thyristors to provide a six step cycle of output power at a selected fundamental frequency on the output lines, each of the fundamental frequency cycle steps including a switching cycle at a switching frequency which is higher than a desired fundamental frequency in each of the three phase output lines, the switching cycle having four time periods wherein in each time period a different pair of thyristors from different sets of thyristors are triggered to conduct, wherein in each time period current flows either in a selected first or a selected second of the output lines and through the third output line in all time periods, with current flowing in one direction alternately in the first and second output lines during the first two time periods, and with current flowing in the opposite direction alternately in the first and second output lines during the third and fourth time periods, the voltages across the first and third output lines and across the second and third output lines reaching zero in each switching cycle to provide commutation of the inverter thyristors, and wherein the voltage across the first and second output lines does not reach zero during the switching cycle, each step of the fundamental frequency cycle having a switching cycle which differs from the switching cycle in each of the other fundamental frequency steps by the output lines which are selected as the first and second output lines or in the direction of current flow in the selected first and second output lines.

24. The power conversion systems of claim 23 wherein the rectifying devices of the rectifier are thyristors and including a controller controlling the switching of the thyristors to maintain a desired DC link current.

\* \* \* \* \*

UNITED STATES PATENT AND TRADEMARK OFFICE
CERTIFICATE OF CORRECTION

PATENT NO. : 5,483,140
DATED : January 19, 1996
INVENTOR(S) : Herbert L. Hess, et al.

It is certified that error appears in the above-indentified patent and that said Letters Patent is hereby corrected as shown below:

On the title page, item [54] and column 1, line 3 ... "MOTOR DRIVEN OPERATION" should be --MOTOR DRIVE OPERATION.

In column 11, line 18 of the patent, "$i_q^{c*}$ and $i_d^{c*}$" should be --$i_q^{e*}$ and $i_d^{e*}$--.

In column 11, line 20 of the patent, "$(i_q^{c*}/I_s)$" should be --$(i_q^{e*}/I_s)$--.

In column 11, line 36 of the patent, "$i_d^{c*}$" should be --$i_d^{e*}$--.

Signed and Sealed this

Twentieth Day of August, 1996

Attest:

BRUCE LEHMAN

*Attesting Officer*        *Commissioner of Patents and Trademarks*